(12) United States Patent
Iizuka (10) Patent No.: US 6,882,453 B2
(45) Date of Patent: Apr. 19, 2005

(54) SCANNING OPTICAL SYSTEM (75) Inventor: Takashi Iizuka, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/690,648

(22) Filed: Oct. 23, 2003

(65) Prior Publication Data
US 2004/0080800 A1 Apr. 29, 2004

(30) Foreign Application Priority Data
Oct. 24, 2002 (JP) ........................................ 2002-309518

(51) Int. Cl.[7] ............................................. G02B 26/08
(52) U.S. Cl. ........................ 359/204; 359/216; 359/205
(58) Field of Search ................................. 359/204, 205, 359/216–219; 347/233, 238, 243–244

(56) References Cited

U.S. PATENT DOCUMENTS 4,390,235 A 6/1983 Minoura

2002/0149666 A1 * 10/2002 Amada et al.

FOREIGN PATENT DOCUMENTS

| JP | 57-54914 | 4/1982 |
| JP | 61-15119 | 1/1986 |
| JP | 61-261715 | 11/1986 |

* cited by examiner

Primary Examiner—James Phan
(74) Attorney, Agent, or Firm—Greenblum & Bernstein, P.L.C.

(57) ABSTRACT

There is provided a scanning optical system for emitting a plurality of beams scanning in a main scanning direction. The scanning optical system includes a first and a second light emitting devices each of which has a linear array of light emitting points. The first and second light emitting devices are positioned such that the linear array of light emitting points of each of the first and second light emitting devices is aligned in parallel with an auxiliary scanning direction and that the beam spots formed by the plurality of beams emitted by the first light emitting device and the beam spots formed by the plurality of beams emitted by the second light emitting devices are alternately arranged on a scan target surface in the auxiliary scanning direction.

10 Claims, 5 Drawing Sheets

FIG. 4A fθ ERROR

FIG. 4B

CURVATURE OF FIELD

FIG. 5

FIG.6A fθ ERROR

FIG.6B

CURVATURE OF FIELD

SCANNING OPTICAL SYSTEM

BACKGROUND OF THE INVENTION

The present invention relates to a scanning optical system configured to simultaneously deflect a plurality of light beams and to converge the plurality of beams on a scan target surface.

Such a scanning optical system is referred to as a multi-beam scanning optical system. Since the multi-beam scanning optical system forms a plurality of scan lines on the scan target surface by simultaneously deflecting the plurality of beams on one reflective surface of a deflector (e.g., a polygonal mirror), imaging speed (i.e., printing speed) can be enhanced.

In this specification, a direction in which a beam spot is scanned on the scan target surface is referred to as a main scanning direction, and a direction perpendicular to the main scanning direction on the scan target surface is referred to as an auxiliary scanning direction.

Japanese Provisional Publication No. SHO 57-54914 (document 1) discloses a multi-beam scanning optical system in which a single light emitting device having a plurality of light emitting points is employed.

Japanese Provisional Publication No. SHO 61-15119 (document 2) discloses another type of the multi-beam scanning optical system in which a plurality of light emitting devices each of which has a single light emitting point are provided.

In both cases of the scanning optical systems disclosed in the document 1 and the document 2, space between adjacent light emitting points can not be shortened under a certain limit determined by a dimensional requirement of the light emitting device. Therefore, if a multi-beam scanning optical system is configured such that the light emitting points are arranged along a line parallel with the auxiliary scanning direction by using the conventional light emitting device, imaging quality is deteriorated. The reason is that a plurality of scan lines formed on a scan target surface by the beams passing through a line image forming lens and an imaging optical system deviate from each other without overlapping with respect to each other.

For this reason, several techniques to make the scan lines overlap one another have been proposed. A first technique is to increase diameters of beam spots on the scan target surface by locating an aperture stop for each beam at a pupil position of the line image forming lens.

However, the first technique has a problem that considerable part of light energy of the beam emitted from each light emitting point is lost by the aperture stop.

A second technique is to reduce intervals of the beam spots in the auxiliary scanning direction by inclining a direction of alignment of the plurality of light emitting points with respect to the auxiliary scanning direction.

Although the second technique enables to reduce intervals of the scan lines, it raises a problem that a direction of the major axis of each beam of a semiconductor laser in far field (i.e., a direction of the major axis of the beam spot on the scan target surface) becomes substantially perpendicular to the auxiliary scanning direction. To avoid this phenomenon, it is required to employ an anamorphic optical system or an aperture stop having the form of a slit for directing the major axis of the beam spot to be parallel with the auxiliary scanning direction.

To employ the anamorphic optical system in the multi-beam scanning optical system increases manufacturing cost of the multi-beam scanning optical system. To employ the aperture stop having the form of the slit reduces efficiency of use of light power of the laser beams.

Even though a diameter of each beam spot can be increased by increasing a lateral magnification of the whole scanning optical system, an increase of the lateral magnification also increases the intervals of the beam spots. Accordingly, in this case, to make the scan lines overlap one another is impossible.

SUMMARY OF THE INVENTION

The present invention is advantageous in that it provides a multi-beam scanning optical system which makes scan lines on a scan target surface overlap one another without employing an expensive anamorphic optical system and without loss of light power of laser beams.

According to an aspect of the invention, there is provided a scanning optical system for emitting a plurality of beams scanning in a main scanning direction. The scanning optical system includes a first and a second light emitting devices each of which has a linear array of light emitting points, a collimator lens system that collimates each of the plurality of beams emitted from the plurality of light emitting points of the first and second light emitting devices, and a first optical system that converges the plurality of beams emerged from the collimator lens system in an auxiliary scanning direction which is perpendicular to the main scanning direction. The scanning optical system further includes a deflector that deflects the plurality of beams emerged from the first optical system to scan in the main scanning direction, and a second optical system that converges the plurality of beams deflected by the deflector on a scan target surface to form a plurality of beam spots scanning in the main scanning direction.

In the above structure, the first optical system forms a plurality of line-like images in the vicinity of the deflector. Further, the first and second light emitting devices are positioned such that the linear array of light emitting points of each of the first and second light emitting devices is aligned in parallel with the auxiliary scanning direction and that the beam spots formed by the plurality of beams emitted by the first light emitting device and the beam spots formed by the plurality of beams emitted by the second light emitting devices are alternately arranged on the scan target surface in the auxiliary scanning direction.

With this configuration, the beam spots formed by the beams of the first light emitting device and beam spots formed by the beams of the second light emitting devices are alternatively arranged on the scan target surface in the auxiliary scanning direction. Therefore, it is possible to make scan lines on the scan target surface overlap one another.

Optionally, an incident angle of each beam emitted by the first light emitting device and an incident angle of each beam emitted by the second light emitting device with respect to the deflector may be different from each other in a plane perpendicular to the auxiliary scanning direction.

In a particular case, the first optical system may include a first cylindrical lens having optical power in the auxiliary scanning direction, and a second cylindrical lens having optical power in the auxiliary scanning direction. Further, the first cylindrical lens is located on a light emitting device side and the second cylindrical lens is located on a deflector side.

Optionally, the first cylindrical lens may have negative power, and the second cylindrical lens may have positive power.

Alternatively or additionally, the second cylindrical lens may satisfy a condition:

$$-1.2 < m_{cL2} < -0.8$$

where $m_{cL2}$ represents a magnification of the second cylindrical lens in the auxiliary scanning direction.

In a particular case, each beam emitted by the first light emitting device and each beam emitted by the second light emitting device may pass through the first optical system at different positions in the main scanning direction. Further, an angle of inclination of at least one of the first cylindrical lens and the second cylindrical lens with respect to an optical axis of the collimator lens system in a plane perpendicular to the auxiliary scanning direction may be adjustable so that a magnification of the scanning optical system in the auxiliary scanning direction with respect to the light emitting points of the first light emitting device and a magnification of the scanning optical system in the auxiliary scanning direction with respect to the light emitting points of the second light emitting device can be adjusted to values different from each other.

Still optionally, a position of at least one of the first cylindrical lens and the second cylindrical lens along an optical axis thereof may be adjustable.

In a particular case, the scanning optical system may include a supporting unit that supports the first and second cylindrical lenses at both ends of each of the first and second cylindrical lenses in the main scanning direction such that a position of each of the first and second cylindrical lenses along an optical axis of the collimator lens system can be adjusted, the supporting unit being fixed in the scanning optical system.

In a particular case, the scanning optical system may include a frame to which the first light emitting device, the second light emitting device, the collimator lens system, the first optical system, the deflector, and the second optical system are fixed. Further, the scanning optical system may include a supporting unit that supports the first and second cylindrical lenses at both ends of each of the first and second cylindrical lenses in the main scanning direction such that an angle of inclination of each of the first and second cylindrical lenses with respect to an optical axis of the collimator lens system in a plane perpendicular to the auxiliary scanning direction can be adjusted, the supporting unit being fixed to the frame.

In a particular case, each of the first and second light emitting devices is a semiconductor laser array.

In a particular case, the first light emitting device and the second light emitting device are shifted from each other by a shift amount which is ½ of a pitch of adjacent light emitting points of each of the first and second light emitting devices in the auxiliary scanning direction.

DETAILED DESCRIPTION OF THE EMBODIMENTS

Hereinafter, an embodiment according to the invention are described with reference to the accompanying drawings.

Figure 1:
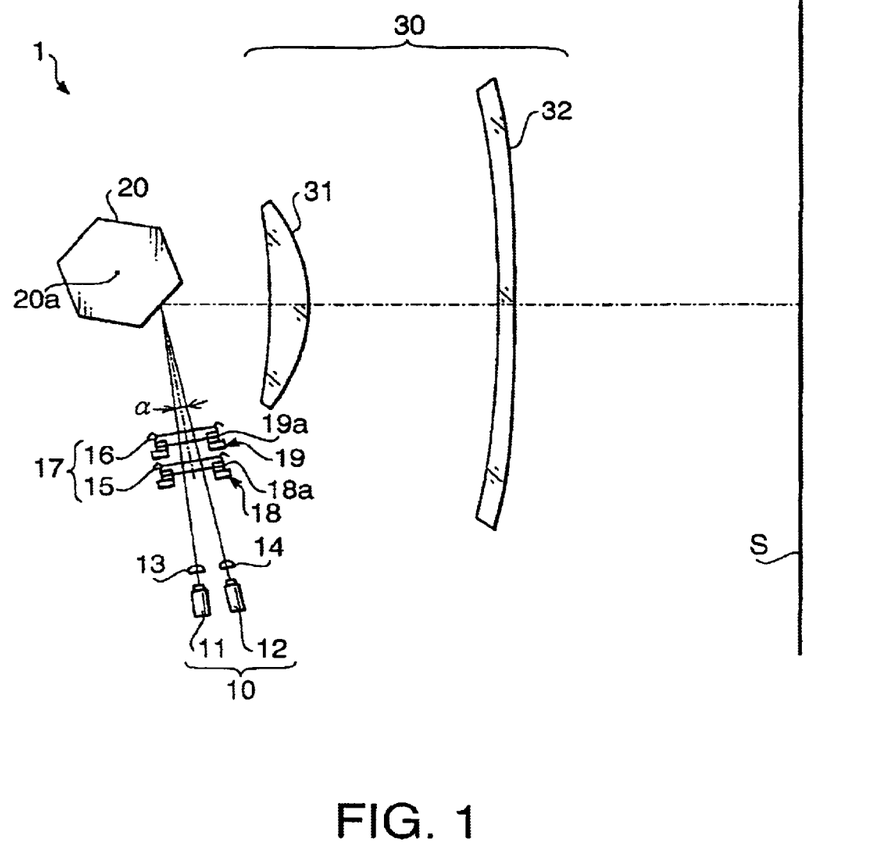
FIG. 1 is a top view of a scanning optical system according to an embodiment of the invention.
Figure 2:
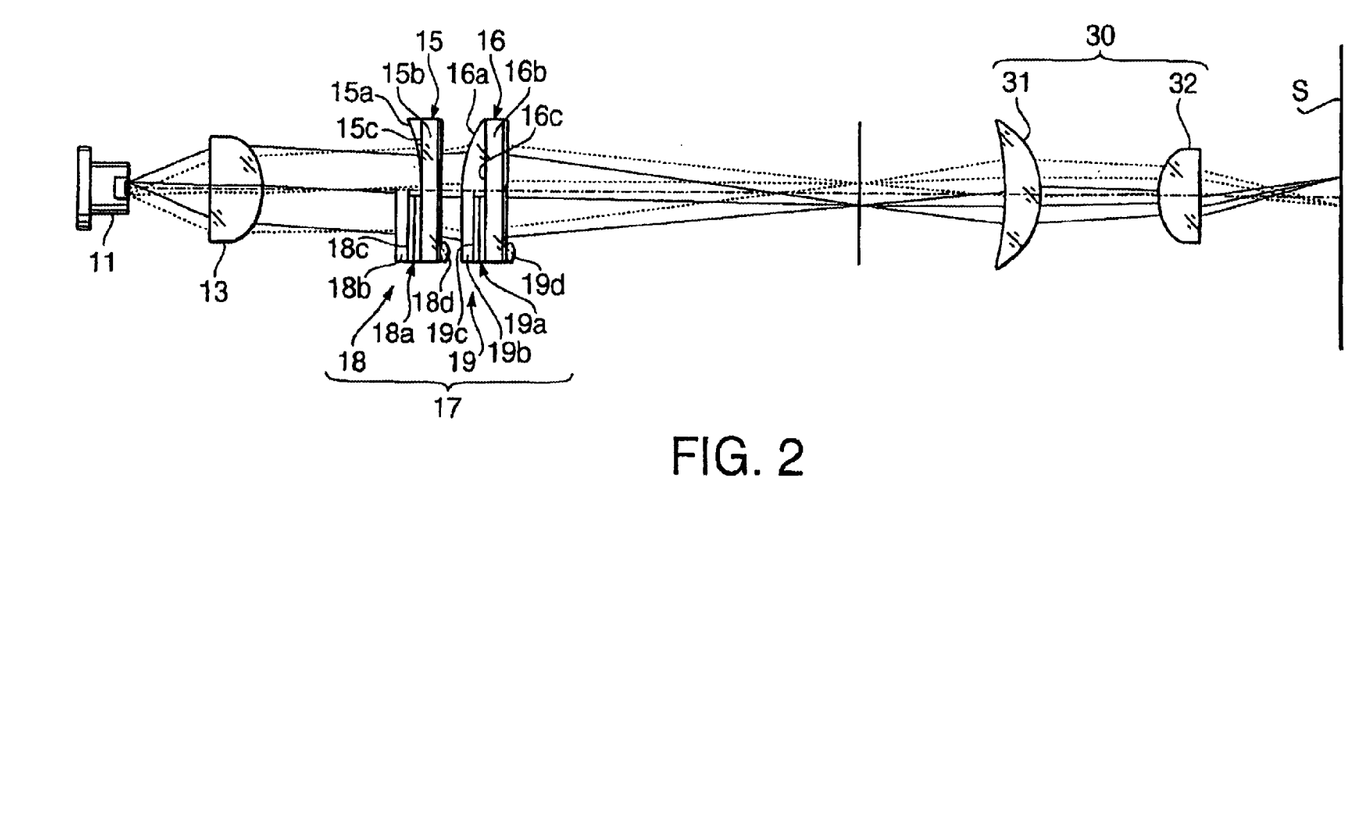
FIG. 2 is a side view of the scanning optical system shown in FIG. 1.

FIG. 1 is a top view of a scanning optical system 1 according to the embodiment of the invention. FIG. 2 is a side view of the scanning optical system 1. As shown FIGS. 1 and 2, the scanning optical system 1 includes a light source 10, collimator lenses 13 and 14, a first optical system (a line image forming lens) 17, a polygonal mirror 20 which functions as a deflector., and a second optical system (an imaging optical system) 30.

The light source 10 includes semiconductor laser arrays 11 and 12 each of which has a plurality of light emitting points (a linear array of light emitting points) from which a plurality of beams are emitted. The beams emitted by the light source 10 are collimated by the collimator lenses 13 and 14, respectively. Each beam emerged from the collimator lens 13 (14) is converged in the auxiliary scanning direction (i.e., a direction parallel with a rotational axis 20a of the polygonal mirror 20) by the first optical system 17 having refractive power only in the auxiliary scanning direction. Consequently, a plurality of line-like images are formed in the vicinity of a reflective surface of the polygonal mirror 20.

The polygonal mirror 20 having a plurality of reflective surfaces rotates about the rotational axis 20a to dynamically deflect the beams incident thereon within a predetermined angular range. Each beam deflected by the polygonal mirror 20 is converged by the second optical system 30 onto a photoconductive drum (hereafter, referred to as a scan target surface S) to form a beam spot scanning in the main scanning direction.

Hereafter, a plane which is parallel with the main scanning direction and includes an optical axis of the second optical system 30 is referred to as a main scanning plane, and a plane which is perpendicular to the main scanning plane and includes the optical axis of the second optical system 30 is referred to as an auxiliary scanning plane.

As shown in FIG. 1, the semiconductor lasers 11 and 12 are located adjacent to each other when they are viewed along a line parallel with the rotation axis 20 a of the polygonal mirror 20. More specifically, the semiconductor lasers 11 and 12 are positioned such that the beams respectively emitted by the semiconductor lasers 11 and 12 and passed through the first optical system 17 impinge on the reflective surface of the polygonal mirror 20 with incident angles of the beams with respect to the reflective surface being different from each other. Further, the beams emerged from the first optical system 17 intersect with each other, in the main scanning plane, in the vicinity of the reflective surface of the polygonal mirror 20.

The plurality of light emitting points (for example, two light emitting points) of each of the semiconductor lasers 11 and 12 are aligned along a line parallel with the auxiliary scanning direction (see FIG. 2). The semiconductor lasers 11 and 12 have the same configuration. With regard to the auxiliary scanning direction, the semiconductor lasers 11 and 12 are shifted by ½ of a pitch between adjacent light emitting points of each semiconductor laser with respect to each other. That is, four light emitting points having intervals of ½ of the pitch of the light emitting points of each semiconductor laser are aligned in the auxiliary scanning direction when the four light emitting points are viewed along a line perpendicular to the auxiliary scanning direction.

As shown in FIG. 2, the first optical system 17 includes a cylindrical lens 15 having negative power in the auxiliary scanning direction and a cylindrical lens 16 having positive power in the auxiliary scanning direction. As described above, total refractive power of the cylindrical lenses 15 and 16 in the auxiliary scanning direction is positive. Therefore, each beam emitted by the semiconductor laser 11 (12) as a divergent beam and collimated by the collimator lens 13 (14) is converged by the first optical system 17 to form the line-like image extending perpendicularly to the auxiliary scanning direction on a focal plane of the first optical system 17.

The focal plane includes a position at which the beams emerged from the first optical system intersect with each other in the main scanning plane.

An interval between adjacent line-like images formed by the beams emitted by the semiconductor laser 11 is equal to a pitch between adjacent light emitting points of the semiconductor laser 11 multiplied by a total magnification of the collimator lens 13 and the first optical system 17. Also, an interval between line-like images formed by the beams emitted by the semiconductor laser 12 is equal to a pitch between adjacent light emitting points of the semiconductor laser 12 multiplied by a total magnification of the collimator lens 14 and the first optical system 17.

Since, as described above, the semiconductor lasers 11 and 12 are shifted by ½ of the pitch between adjacent light emitting points of each semiconductor laser with respect to each other in the auxiliary scanning direction, the line-like images formed by the beams emitted by the semiconductor laser 11 and the line-like images formed by the beams emitted by the semiconductor laser 12 are alternately positioned in the auxiliary scanning direction on the focal plane.

As shown in FIG. 2, the cylindrical lens 15 (16) has a central portion 15a (16a) having a cylindrical surface and a pair of side portions 15b (16b) which protrude from both ends of the central portion 15a in the main scanning direction. Each of the pair of the side portions 15b has the form of a flat plate and has a light source side surface 15c (16c) to be pressed against a supporting unit 18 (19) fixed to a frame (not shown). The light source side surface 15c (16c) of the cylindrical lens 15 (16) is parallel with both of a direction of a generatrix of the cylindrical surface of the cylindrical lens 15 (16) and the auxiliary scanning direction. With this structure, the cylindrical lens 15 (16) can be fixed to the frame by the supporting unit 18 (19).

More specifically, the supporting unit 18 (19) includes a rectangular solid 18b (19b) having a surface 18c (19c) to which the light source side surface 15c (16c) of the cylindrical lens 15 (16) is pressed, a spacer 18a (19a), and a spring 18d (19d) fixed to the frame on the opposite side of the rectangular solid 18b (19b) with respect to the side portions 15b (16b). The rectangular solid 18b (19b) is fixed to the frame (i.e., protrudes from the frame) such that the surface 18c (19c) is perpendicular to a symmetric axis (shown by a chain line in FIG. 1) of the semiconductor lasers 11 and 12 (i.e., the symmetric axis of the collimator lenses 13 and 14).

Since the spring 18d (19d) presses the light source side surface 15c (16c) of the cylindrical lens 15 (16) against the rectangular solid 18b (19b) via the spacer 18a (19a), the cylindrical lens 15 (16) is supported.

As shown in FIG. 2, the spacer 18a (19a) has a plurality of thin plates. Accordingly, by changing the number of the thin plates of the spacer 18a (19a), a position of the cylindrical lens 15 (16) in a direction of an optical axis of the cylindrical lens 15 (16) and an angle of inclination of the cylindrical lens 15 (16) with respect to incident beams (i.e., an optical axis of the collimator lens 13 (14)) in the main scanning plane can be adjusted individually.

The beam deflected by the polygonal mirror 20 enters the second optical system 30 as a beam which is collimated in the main scanning direction and is divergent in the auxiliary scanning direction. With regard to the main scanning direction, the second optical system 30 converges the beam onto a position which has distance y (y=kθ, where k is a scan coefficient and θ is an angle of the beam with respect to the optical axis of the second optical system) from the optical axis.

With regard to the auxiliary scanning direction, the second optical system 30 converges each incident beam onto the scan target surface S and flips incident beams with respect to the optical axis.

With this structure, a plurality of beam spots scanning in the main scanning direction at a constant speed are formed on the scan target surface S.

Figure 3:
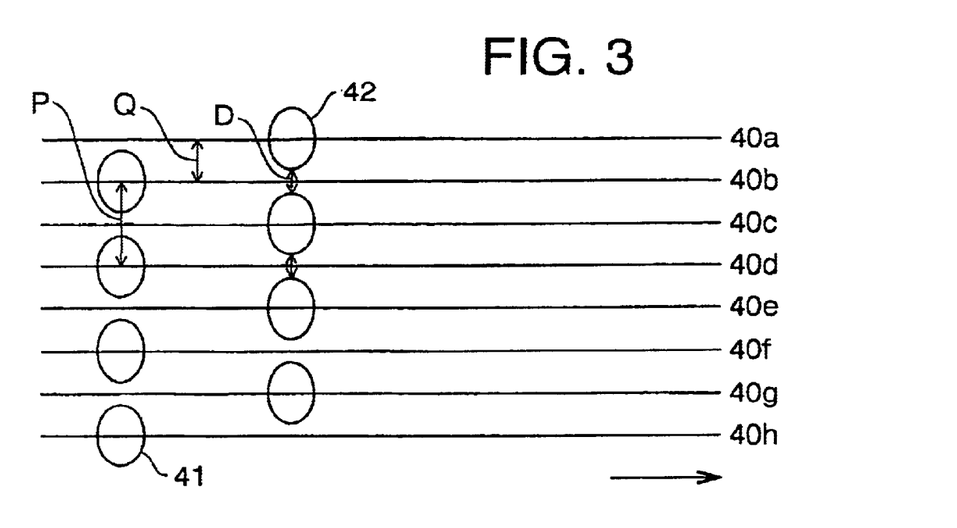
FIG. 3 illustrates positions of beam spots formed by beams emitted from light emitting points of semiconductor lasers on the scan target surface.

FIG. 3 illustrates positions of the beam spots formed by the beams emitted from the light emitting points of the semiconductor lasers 11 and 12 on the scan target surface. A row of beam spots 41 which are formed by the beams from the semiconductor laser 11 have intervals corresponding to the intervals of the line-like images formed by the collimator lens 13 and the first optical system 17. Also, a row of beam spots 42 which are formed by the beams from the semiconductor laser 12 have intervals corresponding to the intervals of the line-like images formed by the collimator lens 14 and the first optical system 17.

As shown in FIG. 3, the row of beam spots 41 and the row of beam spots 42 are separated by a certain distance in the main scanning direction. Also, beam spots of the row 41 and beam spots of the row 42 are alternately positioned in the auxiliary scanning direction.

In FIG. 3, lines 41a–41h represent loci of the row of beam spots 41 and 42. As can be seen from FIG. 3, space D of the beam spots in each of the row 41 and the row 42 is smaller than the length of the major axis of the beam spot. Further, the interval Q between adjacent loci is ½ of the interval P between adjacent beam spots of each of the row 41 and the row 42. Consequently, the scan lines overlap with respect to each other, and thereby imaging quality can be enhanced.

Since the position at which the line-like images are formed in the vicinity of the reflective surface of the polygon mirror 20 and the scan target surface S are set optically conjugate with each other by the second optical system 30, deviation of the scan lines on the scan target surface S in the auxiliary scanning direction caused by slight tilting (the so called "facet error") of each reflective surface of the polygon mirror 20 is corrected and eliminated.

Meanwhile, there is a possibility that a magnification of the collimator lens 13 with respect to the light emitting points of the semiconductor laser 11 and a magnification of the collimator lens 14 with respect to the light emitting points of the semiconductor laser 12 are different from each other because the semiconductor lasers 11 and 12 and the collimator lenses 13 and 14 are separate components and are mounted separately. In other words, there is a possibility that intervals of the beam spots in the row 41 are different from intervals of the beam spots in the row 42.

If such a phenomenon occurs, variation of intervals of the loci 40a–40h occurs. As a result, quality of the image formed on the scan target surface S deteriorates.

For this reason, the scanning optical system 1 is configured such that the magnification of the collimator lens 13 and the first optical system 17 with respect to the semiconductor laser 11 and the magnification of the collimator lens 14 and the first optical system 17 with respect to the semiconductor laser 12 can be adjusted individually by changing the angles of inclination of the cylindrical lenses 15 and 16 with respect to the incident beams and the positions of the cylindrical lenses 15 and 16 along the optical axis of the collimator lenses 13 and 14. That is, the magnification of the collimator lens 13 and the first optical system 17 with respect to the semiconductor laser 11 and the magnification of the collimator lens 14 and the first optical system 17 with respect to the semiconductor laser 12 can be adjusted to values different from each other.

Adjustment of the angle of inclination and the position of the cylindrical lens 15 (16) will be described in detail. Firstly, a worker mounts the light source 10, the collimator lenses 13 and 14, the first optical system 17, the polygonal mirror 20, and the second optical system 30 on the frame. Then, the worker places a test screen at a position at which the scan target surface S is located.

Next, the semiconductor lasers 11 and 12 are energized alternately by the worker so as to measure the intervals of the beam spots of the row 41 and the intervals of the beam spots of the row 42 are measured.

Based on the result of the measurement, the worker adjusts the position of the cylindrical lens 15 (16) along the optical axis of the cylindrical lens 15 (16) and the angle of inclination of the cylindrical lens 15 (16) with respect to the incident beams individually. That is, the worker adjusts the magnification of the collimator lens 13 and the first optical system 17 with respect to the semiconductor laser 11 and the magnification of the collimator lens 14 and the first optical system 17 with respect to the semiconductor laser 12 individually.

It should be noted that by adjusting the position of the cylindrical lens 15 (16) along the optical axis, a distance between the cylindrical lens 15 and the cylindrical lens 16 and a distance between the cylindrical lens 16 and the polygonal mirror 20 are also adjusted.

By thus adjusting the magnifications, the intervals between the beam spots of the row 41 and the intervals between the beam spots of the row 42 can be widened or narrowed individually. Therefore, all of the intervals of the beam spots of the rows 41 and 42 can be adjusted to have constant intervals. That is, an overlapping condition of the adjacent scan lines can be brought to an ideal condition.

It should be noted that by adjusting the position of the cylindrical lens 15 (16) along the optical axis and the angle of inclination of the cylindrical lens 15 (16) with respect to the incident beams, a focal point of a total optical system including the collimator lens 13 (14) and the first optical system 17 can also be adjusted. Therefore, the intervals of the line-like images can be adjusted to have constant intervals while an ideal focusing condition of the line-like images can be accomplished.

To adjust the position along the optical axis and the angle of inclination of both of the cylindrical lenses 15 and 16 may be troublesome to the worker. For this reason, only one of the cylindrical lenses 15 and 16 may be adjusted.

In a case where only one of the cylindrical lenses 15 and 16 is adjusted, there is a possibility that the focal point of a total optical system including the collimator lens 13 and the first optical system 17 for the beam from the semiconductor laser 11 and the focal point of a total optical system including the collimator lens 14 and the first optical system 17 for the beam from the semiconductor laser 12 deviate from each other.

To make this deviation of the focal points minimum, the cylindrical lens 16 of the first optical system 17 is configured to satisfy a condition (1):

$$-1.2 < m_{cL2} < -0.8 \tag{1}$$

where $m_{cL2}$ represents a design magnification of the cylindrical lens 16 in the auxiliary scanning direction. In this embodiment, $m_{cL2}$ is approximately −1.

If the design magnification $m_{cL2}$ is −1, the magnification of the total optical system including the first optical system 17 and the collimator lens 13 and the magnification of the total optical system including the first optical system 17 and the collimator lens 14 can be adjusted individually while a deviation between the focal points caused by adjusting one of the cylindrical lenses 15 and 16 can be kept at a minimum. The inventor of this invention has found that if the condition (1) is satisfied, the amount of deviation of the beam spot on the scan target surface S can be kept within an allowed range.

Hereafter, two numerical examples according to the embodiment will be described.

In the following examples, there is a case where the second optical system 30 has a rotationally asymmetrical optical surface. Meanwhile, such a rotationally asymmetrical optical surface does not have an optical axis as a symmetry axis of a rotationally symmetrical optical surface. Therefore, with regard to the rotationally asymmetrical optical surface, the term "optical axis" means an optical surface reference axis that passes through an origin that is set when the shape of the optical surface is described in a mathematical expression.

FIRST EXAMPLE

Since a first example has the configuration which is substantially the same as that show in FIG. 1, the fist example is explained using numerical references shown in FIG. 1. In the first example, the scan coefficient k is 200, a focal length of the second optical system 30 is 200.0 mm, and a scanning width by which the beam spot is scanned on the scan target surface S is 300 mm.

A focal length of each of the collimator lenses 13 and 14 is 8.7 mm. Each of the semiconductor lasers 11 and 12 has four light emitting points. The pitch between adjacent light emitting points of each of the semiconductor lasers 11 and 12 is 14 µm. An angle α (see FIG. 1) formed between the beam emitted from the semiconductor laser 11 and the beam emitted from the semiconductor laser 12 in the main scanning plane is 4°.

TABLE 1 shows a concrete numerical configuration of the first example from the first optical system 17 through the scan target surface S. In TABLE 1, for the first optical system 17, values along the symmetric axis are indicated. For the second optical system 30, values on the optical axis are indicated.

TABLE 1

| No. | Ry | Rz | d | N |
|---|---|---|---|---|
| #1 | ∞ | −25.540 | 4.00 | 1.51072 |
| #2 | ∞ | ∞ | 10.00 | — |
| #3 | ∞ | 16.000 | 4.00 | 15.1072 |
| #4 | ∞ | ∞ | 60.000 | — |
| #5 | — | — | 45.00 | — |
| #6 | −209.239 | — | 16.00 | 1.48617 |
| #7 | −62.639 | — | 79.77 | — |
| #8 | −488.088 | 32.779 | 7.00 | 1.48617 |
| #9 | 4586.696 | — | 110.38 | — |

In TABLE 1, the character "No." indicates surface numbers that are assigned to optical surfaces in the first example starting from a front surface (a beam incident surface) of the cylindrical lens 15. The #1 and #2 denote the front surface and a rear surface (a beam emerging surface) of the cylindrical lens 15, respectively. The #3 and #4 denote a front surface and a rear surface of the cylindrical lens 16, respectively. The #5 denotes the reflective surface of the polygonal mirror 20. The #6 and #7 denote a front surface and a rear surface of a lens 31 of the second optical system 30, respectively. The #8 and #9 denote a front surface and a rear surface of a lens 32 of the second optical system 30, respectively.

The character "Ry" denotes a radius of curvature [mm] of each optical surface measured in the main scanning direction, and "Rz" denotes a radius of curvature [mm] of each optical surface measured in the auxiliary scanning direction. The character "d" denotes the distance [mm] between the optical surface and the next optical surface, and "N" denotes a refractive index of each lens at a design wavelength 780 nm.

As can be seen from TABLE 1, the front surface of the cylindrical lens 15 is a cylindrical surface (a concave surface), and the rear surface of the cylindrical lens 15 is a flat surface. The front surface of the cylindrical surface 16 is a cylindrical surface (a convex surface), and the rear surface of the cylindrical lens 16 is a flat surface.

The surfaces #6, #7 and #9 are rotationally symmetrical aspherical surfaces.

The rotationally symmetrical aspherical surface is expressed by a following equation:

$$X(h) = \frac{\left(\frac{1}{Ry}\right)h^2}{1 + \sqrt{1-(1+\kappa)^2 h^2 \left(\frac{1}{Ry}\right)^2}} + A_4 h^4 + A_6 h^6 + A_8 h^8 \quad (2)$$

where X(h) represents a SAG amount which is a distance between a point on the aspherical surface at a height of h from the optical axis and a plane tangential to the aspherical surface at the optical axis. κ represents a conical coefficient, and $A_4$, $A_6$ and $A_8$ are aspherical coefficients of $4^{th}$, $6^{th}$ and $8^{th}$ orders, respectively. The radii of curvatures of the rotationally symmetrical aspherical surfaces in TABLE 1 are those on the optical axis. The conical coefficient and aspherical coefficients of surfaces #6, #7 and #9 are indicated in TABLE 2.

TABLE 2

| | #6 | #7 | #9 |
|---|---|---|---|
| κ | 0.0 | 0.0 | 0.0 |
| $A_4$ | 2.20739E−07 | 4.50479E−07 | −1.12222E−07 |
| $A_6$ | 1.69453E−11 | 7.38480E−11 | 2.01000E−12 |
| $A_8$ | −1.36254E−14 | 1.13699E−14 | −1.57552E−16 |

The front surface #8 of the lens 32 is an anamorphic aspherical surface whose cross section in the main scanning direction is defined by a function of a height from the optical axis in the main scanning direction and whose curvature of a cross section in the auxiliary scanning direction is defined by a function of a height from the optical axis in the main scanning direction.

The anamorphic aspherical surface is defined by following equations.

$$X(Y) = \frac{\left(\frac{1}{Ry}\right)Y^2}{1 + \sqrt{1-(1+\kappa)^2 Y^2 \left(\frac{1}{Ry}\right)^2}} + AM_1 Y + AM_2 Y^2 + \quad (3)$$

$$AM_3 Y^3 + AM_4 Y^4 + AM_5 Y^5 + AM_6 Y^6 + AM_7 Y^7 + AM_8 Y^8$$

$$\frac{1}{Rz(Y)} = \frac{1}{Rz} + AS_1 Y + AS_2 Y^2 + AS_3 Y^3 + \quad (4)$$

$$AS_4 Y^4 + AS_5 Y^5 + AS_6 Y^6 + AS_7 Y^7 + AS_8 Y^8$$

where X(Y) is a SAG amount which is obtained as a function of a coordinate Y extending in the main scanning direction. The SAG amount X(Y) represents a distance between a plane tangential to the anamorphic aspherical surface at the optical axis and a point on a curved line extending along the anamorphic aspherical surface in the main scanning direction and passing the optical axis thereof. 1/Ry represents curvature of the anamorphic aspherical surface in the main scanning direction at the optical axis. Further, 1/Rz(Y) represents curvature of an arc extending in the auxiliary scanning direction, and the arc is intersecting the curved line at the point whose coordinate is Y. κ represents a conical coefficient, and $AM_n$ is an aspherical coefficient of $n^{th}$ order for the main scanning direction. $AS_n$ is an aspherical coefficient of $n^{th}$ order for determining the curvature in the auxiliary scanning direction.

Values of the coefficients for the surface #8 are indicated in TABLE 3.

TABLE 3 surface #8 (anamorphic aspherical surface)
κ = 0.000

| | | | |
|---|---|---|---|
| $AM_1$ = | 0.00000E−00 | $AS_1$ = | −2.06714E−06 |
| $AM_2$ = | 0.00000E−00 | $AS_2$ = | −1.23135E−06 |
| $AM_3$ = | 0.00000E−00 | $AS_3$ = | 0.00000E−00 |
| $AM_4$ = | 6.44055E−08 | $AS_4$ = | 3.72299E−11 |
| $AM_5$ = | 0.00000E−00 | $AS_5$ = | 0.00000E−00 |
| $AM_6$ = | −8.52286E−12 | $AS_6$ = | 0.00000E−00 |
| $AM_7$ = | 0.00000E−00 | $AS_7$ = | 0.00000E−00 |
| $AM_8$ = | 1.95991E−16 | $AS_8$ = | 0.00000E−00 |

The TABLE 4 indicates change of the interval between the adjacent beam spots for each of the row of beams 41 and the row of beams 42 when only the angle of inclination of the cylindrical lens 15 is changed.

TABLE 4

| Angle of inclination | Interval of beam spots the row 42 | Interval of beam spots of the row 41 |
|---|---|---|
| −10° | 0.08354 | 0.08509 |
| −5° | 0.08390 | 0.08467 |
| 0° | 0.08428 | 0.08428 |
| 5° | 0.08467 | 0.08390 |
| 10° | 0.08494 | 0.08354 |

In TABLE 4, the angle of inclination represents an angle of the generatrix of the cylindrical surface of the cylindrical lens 15 with respect to a line perpendicular to the symmetric axis of the cylindrical lens 15. Therefore, the angle of inclination of 0° means a condition in which the generatrix of the cylindrical surface of the cylindrical lens 15 is perpendicular to the symmetric axis in the main scanning plane.

The angle of inclination having positive values means a condition in which the generatrix of the cylindrical face of the cylindrical lens 15 is inclined counterclockwise on FIG. 1 about its center (i.e., an intersection point between the symmetric axis and a line passing through a center position in a direction of its thickness).

The "Interval of beam spots of the row 42" in TABLE 4 represents the interval P (see FIG. 3) of the adjacent beam spots of the row 42 formed by the beams from the semiconductor laser 12. "The Interval of beam spots of the row 41" represents the interval P (see FIG. 3) of the adjacent beam spots of the row 41 formed by the beams from the semiconductor laser 11.

It is understood from TABLE 4 that by only adjusting the angle of inclination of the cylindrical lens 15, the interval of beam spots of the row 41 and the interval of beam spots of the row 42 can be changed individually.

Figure 4A:
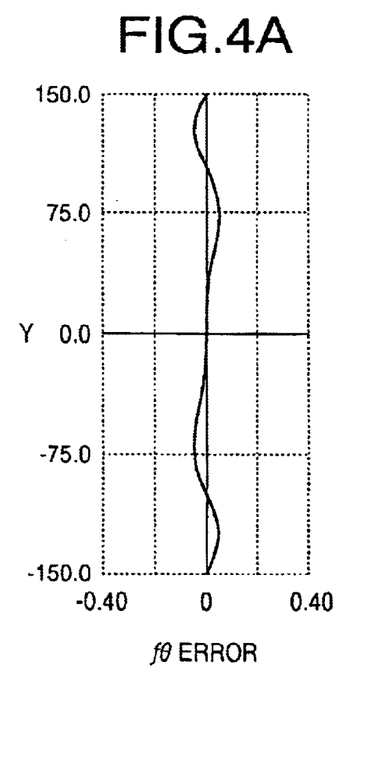
FIG. 4A is a graph illustrating an fθ error of a second optical system according to a first example.

FIG. 4A is a graph illustrating an fθ error of the second optical system 30 according to the first example. In FIG. 4A, a vertical axis represents a height Y from the optical axis of the second optical system 30 on the scan target surface S, and a horizontal axis represents a shift amount of the actual position of the beam spot from an ideal position of the beam spot (i.e., the image height y defined according to the above expression y=kθ).

Figure 4B:
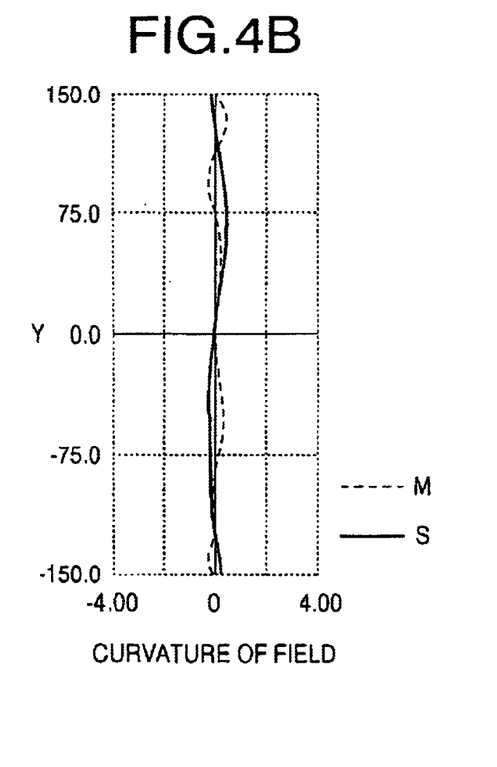
FIG. 4B is a graph illustrating curvature of field of the second optical system according to the first example.

FIG. 4B is a graph illustrating curvature of field of the second optical system 30 according to the first example. In FIG. 4B, a vertical axis represents the height Y from the optical axis of the second optical system 30 on the scan target surface S, and a horizontal axis represents a shift amount of the focal point in the direction of the optical axis. In FIG. 4B, a dashed line (M) represents curvature of field in the main scanning direction, and a solid line (S) represents curvature of field in the auxiliary scanning direction.

As can be seen from FIGS. 4A and 4B, aberrations of the scanning optical system of the first example are sufficiently low.

SECOND EXAMPLE

Figure 5:
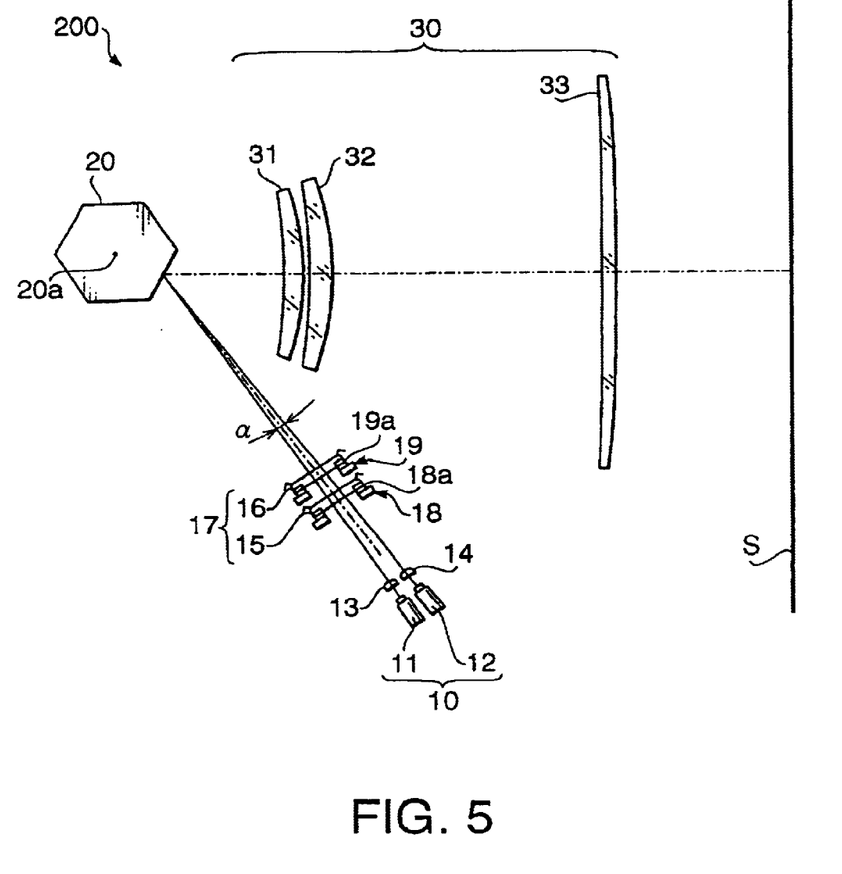
FIG. 5 is a top view of a scanning optical system according to a second example.

FIG. 5 is a top view of a scanning optical system 200 according to a second example. In FIG. 5, to elements which are the same as those shown in FIG. 1, the same reference numbers are assigned, and explanations thereof are not repeated.

In the second example, the scan coefficient k is 180, a focal length of the second optical system 30 is 180.0 mm, and a scanning width by which the beam spot is scanned on the scan target surface S is 216 mm.

A focal length of each of the collimator lenses 13 and 14 is 7.5 mm. Each of the semiconductor lasers 11 and 12 has two light emitting points. The pitch between adjacent light emitting points of each of the semiconductor lasers 11 and 12 is 14 μm. The angle α (see FIG. 5) formed between the beam emitted from the semiconductor laser 11 and the beam emitted from the semiconductor laser 12 in the main scanning plane is 4°.

TABLE 5 shows a concrete numerical configuration of the second example from the first optical system 17 through the scan target surface S. Symbols and fields of TABLE 5 have the same meanings as those of TABLE 1.

TABLE 5

| No. | Ry | Rz | d | N |
|---|---|---|---|---|
| #1 | ∞ | −25.540 | 4.00 | 1.51072 |
| #2 | ∞ | ∞ | 47.35 | — |
| #3 | ∞ | 24.800 | 4.00 | 1.51072 |
| #4 | ∞ | −24.800 | 48.60 | — |
| #5 | — | — | 45.00 | — |
| #6 | −198.000 | — | 8.25 | 1.48617 |
| #7 | −103.850 | — | 2.00 | — |
| #8 | −1083.220 | — | 10.00 | 1.48617 |
| #9 | −130.000 | — | 115.65 | — |
| #10 | −1000.000 | 35.627 | 5.00 | 1.48617 |
| #11 | −1000.000 | — | 60.30 | — |

In TABLE 5, #1 and #2 denote a front surface (a beam incident surface) and a rear surface (a beam emerging surface) of the cylindrical lens 15, respectively. The #3 and #4 denotes a front surface and a rear surface of the cylindrical lens 16, respectively. The #5 denotes the reflective surface of the polygonal mirror 20. The #6 and #7 denote a front surface and a rear surface of a lens 31 of the second optical system 30, respectively. The #8 and #9 denote a front surface and a rear surface of a lens 32 of the second optical system 30, respectively. The #10 and #11 denote a front surface and a rear surface of a lens 33 of the second optical system 30, respectively.

As can be seen from TABLE 5, the front surface of the cylindrical lens 15 is a cylindrical surface (a concave surface), and the rear surface of the cylindrical lens 15 is a flat surface. The front surface of the cylindrical lens 16 is a cylindrical surface (a convex surface), and the rear surface of the cylindrical lens 16 is a flat surface. Surfaces #8, #9 and #11 are spherical surfaces.

The surfaces #6, #7 are rotationally symmetrical aspherical surfaces expressed by the equation (2). The conical coefficient and aspherical coefficients of surfaces #6, #7 are indicated in TABLE 6.

TABLE 6

| | #6 | #7 |
|---|---|---|
| κ | 0.0 | 0.0 |
| $A_4$ | −8.66207E−08 | −2.64892E−08 |
| $A_6$ | 2.51495E−10 | 1.29004E−10 |
| $A_8$ | −1.49724E−14 | 3.21371E−14 |

The front surface #10 of the lens 33 is an anamorphic aspherical surface expressed by the equations (3) and (4). Values of the coefficients for the surface #10 are indicated in TABLE 7.

TABLE 7

| surface #10 (anamorphic aspherical surface) κ = 0.000 | | | |
|---|---|---|---|
| $AM_1$ = | 0.00000E-00 | $AS_1$ = | 0.00000E-00 |
| $AM_2$ = | 0.00000E-00 | $AS_2$ = | -8.84504E-07 |
| $AM_3$ = | 0.00000E-00 | $AS_3$ = | 0.00000E-00 |
| $AM_4$ = | 4.28542E-08 | $AS_4$ = | 2.20583E-11 |
| $AM_5$ = | 0.00000E-00 | $AS_5$ = | 0.00000E-00 |
| $AM_6$ = | -9.52269E-13 | $AS_6$ = | 0.00000E-00 |
| $AM_7$ = | 0.00000E-00 | $AS_7$ = | 0.00000E-00 |
| $AM_8$ = | 0.00000E-00 | $AS_8$ = | 0.00000E-00 |

The TABLE 8 indicates change of the interval between the adjacent beam spots for each of the row of beams 41 and the row of beams 42 when only the angle of inclination of the cylindrical lens 16 is changed. Symbols and fields of TABLE 8 have the same meanings as those of TABLE 4.

TABLE 8

| Angle of inclination | Interval of beam spots the row 42 | Interval of beam spots of the row 41 |
|---|---|---|
| -10° | 0.08511 | 0.08320 |
| -5° | 0.08485 | 0.08391 |
| 0° | 0.08446 | 0.08445 |
| 5° | 0.08392 | 0.08484 |
| 10° | 0.08332 | 0.08510 |

Figure 6A:
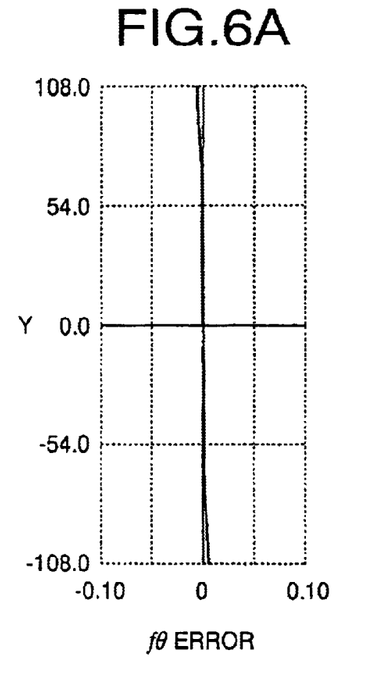
FIG. 6A is a graph illustrating an fθ error of a second optical system according to the second example.

FIG. 6A is a graph illustrating an fθ error of the second optical system 30 according to the second example. In FIG. 6A, a vertical axis represents a height Y from the optical axis of the second optical system 30 on the scan target surface S, and a horizontal axis represents a shift amount of the actual position of the beam spot from an ideal position of the beam spot (i.e., the image height y defined according to the above expression y=kθ).

Figure 6B:
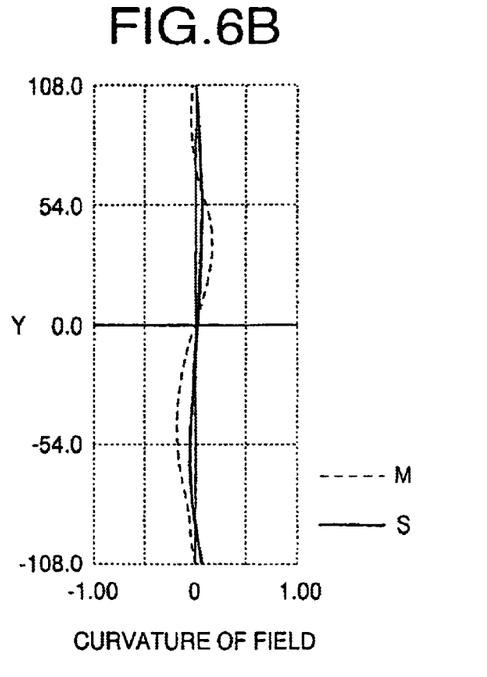
FIG. 6B is a graph illustrating curvature of field of the second optical system according to the second example.

FIG. 6B is a graph illustrating curvature of field of the second optical system 30 according to the second example. In FIG. 6B, a vertical axis represents the height Y from the optical axis of the second optical system 30 on the scan target surface S, and a horizontal axis represents a shift amount of the focal point in the direction of the optical axis. In FIG. 6B, symbols M and S have the same meanings as those of FIG. 4B.

As can be seen from FIGS. 6A and 6B, aberrations of the scanning optical system of the second example are sufficiently low.

As described above, according embodiment of the present invention, it is possible to make scan lines on the scan target surface overlap one another without employing an expensive anamorphic optical system and without loss of light power of laser beams.

Although the present invention has been described in considerable detail with reference to a certain preferred embodiment thereof, other embodiments are possible.

The present disclosure relates to the subject matter contained in Japanese Patent Application-No. P2002-309518, filed on Oct. 24, 2002, which is expressly incorporated herein by reference in its entirety.

What is claimed is:

1. A scanning optical system for emitting a plurality of beams scanning in a main scanning direction, comprising:

first and second light emitting devices each of which has a linear array of light emitting points;

a collimator lens system that collimates each of the plurality of beams emitted from the plurality of light emitting points of said first and second light emitting devices;

a first optical system that converges the plurality of beams emerged from said collimator lens system in an auxiliary scanning direction which is perpendicular to the main scanning direction;

a deflector that deflects the plurality of beams emerged from said first optical system to scan in the main scanning direction; and a second optical system that converges the plurality of beams deflected by said deflector on a scan target surface to form a plurality of beam spots scanning in the main scanning direction, wherein said first optical system forms a plurality of line-like images in the vicinity of said deflector, wherein said first and second light emitting devices are positioned such that the linear array of light emitting points of each of said first and second light emitting devices is aligned in parallel with the auxiliary scanning direction and that the beam spots formed by the plurality of beams emitted by said first light emitting device and the beam spots formed by the plurality of beams emitted by said second light emitting device are alternately arranged on the scan target surface in the auxiliary scanning direction, wherein said first optical system includes;

a first cylindrical lens having optical power in the auxiliary scanning direction; and a second cylindrical lens having optical power in the auxiliary scanning direction, wherein the first cylindrical lens is located on a light emitting device side and the second cylindrical lens is located on a deflector side.

2. The scanning optical system according to claim 1, wherein an incident angle of each beam emitted by said first light emitting device and an incident angle of each bean, emitted by said second light emitting device with respect to said deflector are different from each other in a plane perpendicular to the auxiliary scanning direction.

3. The scanning optical system according to claim 1, wherein said first cylindrical lens has negative power, and said second cylindrical lens has positive power.

4. The scanning optical system according to claim 3, wherein said second cylindrical lens satisfies a condition:

$$-1.2 < m_{cL2} < -0.8$$

where $m_{cL2}$ represents a magnification of said second cylindrical lens in the auxiliary scanning direction.

5. The scanning optical system according to claim 1, wherein each beam emitted by said first light emitting device and each beam emitted by said second light emitting device pass through said first optical system at different positions in the main scanning direction, wherein an angle of inclination of at least one of said first cylindrical lens and said second cylindrical lens with respect to an optical axis of said collimator lens system in a plane perpendicular to the auxiliary scanning direction is adjustable so that a magnification of said scanning optical system in the auxiliary scanning direction with respect to the light emitting points of said first light emitting device and a magnification of said scanning optical system in the auxiliary scanning direction with respect to the light emitting points of said second light emitting device can be adjusted to values different from each other.

6. The scanning optical system according to claim 5, wherein a position of at least one of said first cylindrical lens and said second cylindrical lens along an optical axis thereof is adjustable.

7. The scanning optical system according to claim 1, further comprising a supporting unit that supports said first and second cylindrical lenses at both ends of each of said first and second cylindrical lenses in the main scanning direction such that a position of each of said first and second cylindrical lenses along an optical axis of said collimator lens system can be adjusted, said supporting unit being fixed in said scanning optical system.

8. The scanning optical system according to claim 1, further comprising:
  a frame to which said first light emitting device, said second light emitting device, said collimator lens system, said first optical system, said deflector, and said second optical system are fixed; and
  a supporting unit that supports said first and second cylindrical lenses at both ends of each of said first and second cylindrical lenses in the main scanning direction such that an angle of inclination of each of said first and second cylindrical lenses with respect to an optical axis of said collimator lens system in a plane perpendicular to the auxiliary scanning direction can be adjusted, said supporting unit being fixed to said frame.

9. The scanning optical system according to claim 1, wherein each of said first and second light emitting devices is a semiconductor laser array.

10. The scanning optical system according to claim 1, wherein said first light emitting device and said second light emitting device are shifted from each other by a shift amount which is ½ of a pitch of adjacent light emitting points of each of said first and second light emitting devices in the auxiliary scanning direction.

* * * * *